United States Patent
Michiaki et al.

(10) Patent No.: US 9,114,389 B2
(45) Date of Patent: Aug. 25, 2015

(54) METHOD FOR PRODUCING CATALYST COMPOSITION, CATALYST COMPOSITION, DIESEL PARTICULATE FILTER USING THE SAME, AND EXHAUST GAS PURIFICATION SYSTEM

(75) Inventors: Yoshiyuki Michiaki, Okayama (JP); Takuma Honda, Okayama (JP); Shin Hamada, Okayama (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 104 days.

(21) Appl. No.: 13/805,091

(22) PCT Filed: May 10, 2011

(86) PCT No.: PCT/JP2011/060693
§ 371 (c)(1),
(2), (4) Date: Dec. 18, 2012

(87) PCT Pub. No.: WO2012/017718
PCT Pub. Date: Feb. 9, 2012

(65) Prior Publication Data
US 2013/0095997 A1    Apr. 18, 2013

(30) Foreign Application Priority Data
Aug. 5, 2010    (JP) ................. 2010-176573

(51) Int. Cl.
*B01J 35/00* (2006.01)
*B01D 53/94* (2006.01)
(Continued)

(52) U.S. Cl.
CPC ............. *B01J 35/0006* (2013.01); *B01D 53/94* (2013.01); *B01D 53/944* (2013.01); *B01J 21/066* (2013.01);
(Continued)

(58) Field of Classification Search
CPC .... B01J 35/0006; B01J 23/002; B01J 35/002; B01J 37/036; B01J 37/031; B01J 23/18; B01J 23/44; B01J 23/6447; B01J 37/038; B01J 37/0236; B01J 21/08; B01J 37/0201; B01J 23/63; B01J 21/066; B01J 2523/00; B01D 53/94; B01D 53/944
USPC ....................................................... 502/304
See application file for complete search history.

(56) References Cited

U.S. PATENT DOCUMENTS 5,607,892 A    3/1997    Chopin et al.
6,150,288 A    11/2000    Suzuki et al.
(Continued)

FOREIGN PATENT DOCUMENTS

DE    2209636 A1    4/1973
JP    S47-038898 A    12/1972
(Continued)

OTHER PUBLICATIONS

Search Report from International Application No. PCT/JP2011/060693, mail date is Aug. 16, 2011.
Japanese office action issued with respect to application No. 2012-527625, mail date is May 19, 2015.

*Primary Examiner* — Colleen Dunn
*Assistant Examiner* — Haytham Soliman
(74) *Attorney, Agent, or Firm* — Greenblum & Bernstein, P.L.C.

(57) ABSTRACT

Provided is a catalyst having the ability to combust PM at relatively low temperatures and having high HC and CO removal (conversion) efficiency even at the above operating temperature. In the catalyst composition, at least one kind of platinum group element selected from Pt, Rh, and Pd is dispersed in and supported by a platinum group-supporting carrier containing at least one kind of element selected from Zr, Al, Y, Si, Bi, Pr, and Tb, and the platinum group-supporting carrier is supported on the surface of a Ce oxide containing Ce as an essential component. The catalyst composition has both PM combustion activity and gas purification activity.

2 Claims, 7 Drawing Sheets

(51) Int. Cl.
  *B01J 21/06* (2006.01)
  *B01J 21/08* (2006.01)
  *B01J 23/63* (2006.01)
  *B01J 23/644* (2006.01)
  *B01J 37/02* (2006.01)
  *B01J 37/03* (2006.01)
  *B01J 23/18* (2006.01)
  *B01J 23/44* (2006.01)
  *B01J 23/00* (2006.01)
  *F01N 3/035* (2006.01)

(52) U.S. Cl.
  CPC ............... *B01J 21/08* (2013.01); *B01J 23/002* (2013.01); *B01J 23/18* (2013.01); *B01J 23/44* (2013.01); *B01J 23/63* (2013.01); *B01J 23/6447* (2013.01); *B01J 35/002* (2013.01); *B01J 37/0201* (2013.01); *B01J 37/0236* (2013.01); *B01J 37/031* (2013.01); *B01J 37/036* (2013.01); *B01J 37/038* (2013.01); *B01D 2255/1021* (2013.01); *B01D 2255/1023* (2013.01); *B01D 2255/1025* (2013.01); *B01D 2255/2065* (2013.01); *B01D 2255/2066* (2013.01); *B01D 2255/2096* (2013.01); *B01D 2255/20715* (2013.01); *B01D 2255/915* (2013.01); *B01D 2258/012* (2013.01); *B01J 2523/00* (2013.01); *F01N 3/035* (2013.01)

(56) References Cited

U.S. PATENT DOCUMENTS

| | | |
|---|---|---|
| 8,304,364 B2 | 11/2012 | Michiaki et al. |
| 2007/0060472 A1 | 3/2007 | Fisher et al. |
| 2008/0269046 A1 | 10/2008 | Minoshima et al. |
| 2010/0111778 A1* | 5/2010 | Kaneshiro et al. ............ 422/177 |
| 2011/0027135 A1 | 2/2011 | Michiaki et al. |
| 2011/0165045 A1 | 7/2011 | Ikeda et al. |
| 2011/0176969 A1 | 7/2011 | Michiaki et al. |

FOREIGN PATENT DOCUMENTS

| | | |
|---|---|---|
| JP | 10-182155 | 10/1994 |
| JP | H07-194977 A | 8/1995 |
| JP | H09-187653 A | 7/1997 |
| JP | 2006-525112 | 7/1998 |
| JP | H10-296087 A | 11/1998 |
| JP | 2003-253142 A | 9/2003 |
| JP | 2010-75920 | 1/2005 |
| JP | 4196745 | 1/2005 |
| JP | 2006-247635 A | 9/2006 |
| JP | 4175186 | 11/2006 |
| JP | 2007-029778 A | 2/2007 |
| JP | 2008-024529 A | 2/2008 |
| JP | 2008-105871 A | 5/2008 |
| JP | 6-279027 | 12/2008 |
| JP | 4416830 | 12/2009 |
| JP | 2008-290065 | 4/2010 |

* cited by examiner

METHOD FOR PRODUCING CATALYST COMPOSITION, CATALYST COMPOSITION, DIESEL PARTICULATE FILTER USING THE SAME, AND EXHAUST GAS PURIFICATION SYSTEM

FIELD

The present invention relates to a method for producing a catalyst composition, a catalyst composition, a diesel particulate filter using the same, and an exhaust gas purification system.

BACKGROUND

Diesel engines have higher combustion efficiency than commonly used gasoline engines and are therefore presumed to be used continuously for applications that require efficient use of fuel. However, exhaust gas emitted from diesel engines contains nitrogen oxides (hereinafter may be referred to as "NOx"), hydrocarbons (hereinafter may be referred to as "HC"), carbon monoxide (hereinafter may be referred to as "CO"), and soot composed mainly of carbon (particulate matter, which may be referred to as PM). Therefore, from the environmental point of view, it is not preferable to emit the waste exhaust gas without any treatment.

Particularly, as for automobiles, laws or regulations concerning special measures for total emission reduction of nitrogen oxides, carbon monoxide, and particulate matter from automobiles in specified areas have been enforced. Therefore, it is necessary to continuously seek methods for reducing such emission materials.

In a common exhaust gas purification method, a diesel particulate filter (DPF) composed mainly of a ceramic is used to remove PM in the exhaust gas therefrom. However, since the removed PM is accumulated in the DPF, the accumulated PM must be removed regularly. To remove the PM, heat with a temperature higher than the combustion temperature of the PM is added to the DPF to gasify the PM. Therefore, additional fuel is required for the heating, causing deterioration of fuel consumption.

If the heating temperature can be reduced, the fuel consumption will be improved. Therefore, many studies have been conducted to reduce the heating temperature. The present applicant has conducted extensive studies on catalysts, so-called oxidation catalysts, that allow PM combustion at low temperature (such activity is hereinafter referred to as "PM combustion activity"). Such catalysts have been disclosed in, for example, Patent Literature 1.

Recently, catalysts for exhaust gas purification are expected to allow not only purification of soot but also removal of NOx, HC, and CO in the gas. To remove such components, it is effective to use platinum group elements that have conventionally been considered as three-way catalysts for exhaust gas from gasoline engines. However, it is known that the purification performance of these platinum group elements deteriorates as their grains grow. Therefore, methods for suppressing the growth of the grains of the platinum group elements have been studied (see, for example, Patent Literatures 2 and 3).

CITATION LIST

Patent Literature

Patent Literature 1: Japanese Patent No. 4416830
Patent Literature 2: Japanese Patent No. 4196745
Patent Literature 3: Japanese Patent No. 4175186

SUMMARY

Technical Problem

The technique described in Patent Literature 1 discloses "a complex oxide for an exhaust gas purification catalyst, the complex oxide comprising Ce, Bi, R(R is at least one kind of lanthanoids except for La and Ce), and R' (R' is at least one kind of element selected from group 3, 4, and 13 elements except for lanthanoids and actinoids)." With this technique, the combustion start temperature of PM can be significantly reduced. From this point of view, a catalyst having the ever desired effect (PM combustion activity) can be provided. This catalyst is said to be an epoch-making catalyst.

However, the studies by the present inventors have revealed that, although the catalyst provided by the above technique is an excellent catalyst capable of reducing the combustion temperature of PM, the catalyst is not capable of reducing nitrogen oxides and carbon monoxide. Therefore, it is preferable to impart these characteristics to such a catalyst to provide a more practical catalyst.

In one known method for reducing the amounts of NOx, HC, and CO from gasoline engines, a platinum group element such as Pt is used. However, when such a platinum group element is simply supported on a carrier, grain growth occurs over time, and the catalytic activity may not be maintained, as described above. Therefore, to maintain the ability to reduce the amounts of NOx, HC, and CO (hereinafter referred to as "noxious gas purification activity") over a long period of time, the development of a technique for suppressing the growth of platinum group element grains has been considered to be essential. When considering those suitable for diesel engines, catalysts having both PM combustion activity and noxious gas purification activity are more practical.

Patent Literatures 2 and 3 disclose techniques in which an oxide layer is formed on the surfaces of oxygen absorbing-releasing material particles and a platinum group element is made to be supported on the oxide layer. In these methods, a porous oxide is made to adhere to the surfaces of the oxygen absorbing-releasing material particles in advance, and then the platinum group element is supported on the oxide. This is considered to allow the growth of the grains of the platinum group element to be suppressed.

However, these methods have the following problem. In regions of the surfaces of the oxygen absorbing-releasing material particle on which the porous oxide has not been formed, the platinum group element is not supported on the porous oxide, and therefore grain growth occurs, causing a reduction in noxious gas purification activity. There is another problem in that the platinum group element simply supported on the porous oxide undergoes grain growth when exposed to high temperatures. With any of these methods, a catalyst composition having high efficiency for removal (conversion) of HC and CO in exhaust gas at relatively low temperatures (about 200° C.) cannot be produced.

Solution to Problem

The present inventors have conducted extensive studies and found that a catalyst composition having the following structure can solve the foregoing problems, and thus the invention has been completed. Specifically, a catalyst composition production method of the present invention includes: a step of mixing, in a liquid, at least one kind of platinum group element selected from Pt, Rh, and Pd and at least one kind of element selected from Zr, Al, Y, Si, Bi, Pr, and Tb to obtain a hydroxide gel; an adhesion step of mixing the hydroxide gel with an oxide containing Ce (hereinafter referred also to as a "Ce oxide") to cause the hydroxide gel to adhere to a surface of the Ce oxide; and a step of subjecting the Ce oxide with the hydroxide gel adhering thereto to heat treatment.

A preferred mode of the catalyst composition production method of the present invention is configured such that the adhesion step is performed in an aqueous solution with a pH of 3 to 9.

On the other hand, a catalyst composition of the present invention includes: a Ce oxide; a platinum group-supporting carrier supported on a surface of the Ce oxide; and at least one kind of platinum group element selected from Pt, Rh, and Pd, the platinum group element being dispersed in and supported by the platinum group-supporting carrier.

Preferred modes of the catalyst composition of the present invention are configured such that the platinum group-supporting carrier contains at least one kind of element selected from Zr, Al, Y, Si, Bi, Pr, and Tb, that the platinum group-supporting carrier is a porous oxide, and that the platinum group-supporting carrier is alumina.

Advantageous Effects of Invention

With a diesel particulate filter (DPF) in which a catalyst composition having the above structure has been supported as a catalyst, the amount of a PM component emitted can be reduced, and the amounts of noxious gas components such as HC, CO, NO, and NOx (hereinafter simply referred to also as "noxious gases") in the exhaust gas can also be reduced. In addition, a diesel engine system having such a DPF installed therein can be used as an environmentally friendly system.

DESCRIPTION OF EMBODIMENTS

Figure 1:
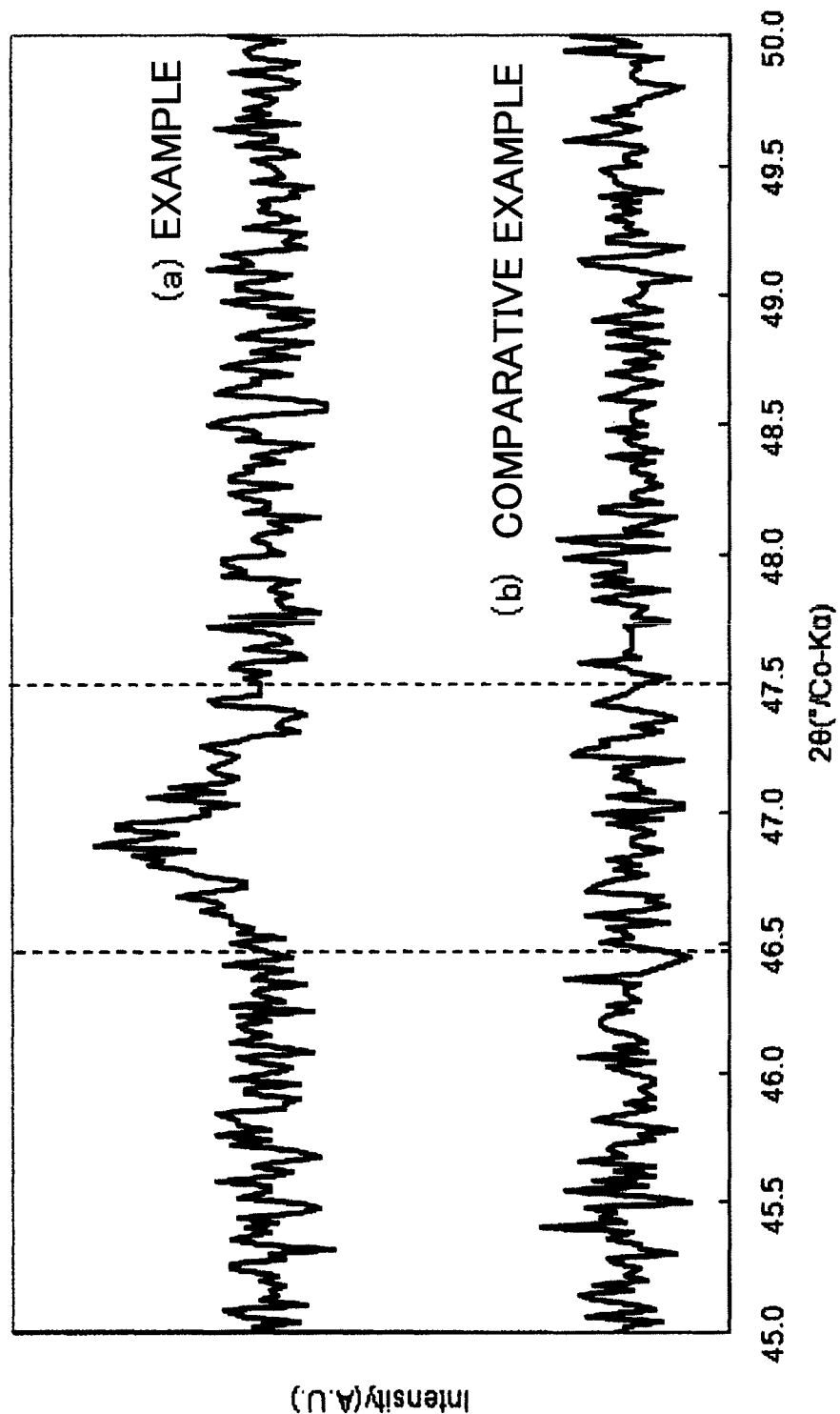
FIG. 1 is a diagram showing the results of X-ray diffraction measurement in Example 1 and Comparative Example 1.

The catalyst composition provided according to the present invention is a composition having catalytic activity. The catalyst composition may have various specific applications. However, in the present specification, a catalyst having both PM combustion activity and noxious gas purification activity, particularly, a catalyst applied to an exhaust gas emitted from a diesel engine, will be described. The catalyst composition has a structure in which a platinum group-supporting carrier formed of Al etc. is formed on the surface of an oxide containing Ce (a Ce oxide) and having PM combustion activity and at least one kind of element selected from Pt, Rh, and Pd (hereinafter referred to also as a "platinum group element") is dispersed in and supported by the platinum group-supporting carrier. The phrase "dispersed in and supported by" means the state in which the platinum group element is dispersed in the entire platinum group-supporting carrier.

The platinum group element is dispersed in the platinum group-supporting carrier and is therefore present therein uniformly in the thickness direction of the platinum group-supporting carrier. More specifically, the platinum group element is dispersed in and supported by the platinum group-supporting carrier formed on the surface of the Ce oxide. Therefore, this state is qualitatively different from the state in which the platinum group element is simply "supported" on the Ce oxide or on the surface of a material formed on the Ce oxide. Particularly, in the "dispersed and supported" state, since the platinum group element is dispersed in and surrounded by the platinum group-supporting carrier, the range of migration of the platinum group element by heat is limited. Therefore, the platinum group element is prevented from undergoing grain growth during firing etc.

The Ce oxide contains Ce as an essential component. Particularly, the Ce oxide is preferably a complex oxide of Ce and at least one kind of element selected from Zr, Al, Y, Si, Bi, Pr, and Tb.

In consideration of the balance between the required characteristics, the ratio of the elements contained in the Ce oxide of the present invention is as follows. Elements in parentheses represent replaceable elements. Here, if the molar ratio of Ce, Bi, Pr (Tb), Zr (Al, Y, Si), and Al (Zr, Si, Ti) is Ce:Bi:Pr (Tb):Zr (Al, Y, Si):Al(Zr, Si, Ti)=(1−a−b−c−d):a:b:c:d, it is preferable that $0<a+b+c\leq0.5$, and $0<d\leq0.3$ be satisfied. The advantages of this composition ratio will be described later. Al (Zr, Si, Ti) is an element constituting the platinum group-supporting carrier (a platinum group-supporting carrier element) described later.

The reason of an increase in PM combustion activity of the Ce oxide containing these elements in the above-described molar ratio includes many unclear points. However, it is considered that the use of Ce as the main constituent component allows high oxygen absorbing-releasing ability to be provided. More specifically, the Ce oxide supplies oxygen to PM during combustion, while the PM is oxidized by the supplied oxygen and removed as gas. It is considered that the Ce oxide contributes to the improvement of the efficiency of removal of PM by oxidation in this manner.

The Ce oxide used in the present invention is a complex oxide composed mainly of Ce as an essential component. Therefore, the mechanism of the oxygen absorbing-releasing ability of the Ce oxide is considered to be the same as the presumed oxygen absorbing-releasing mechanism of conventional Ce-based oxides.

More specifically, cations in an oxide composed mainly of Ce atoms undergo an apparent valence change, and this allows oxygen in the lattice to be easily emitted to the outside of the lattice. By providing such a state, it is considered that active oxygen necessary for oxidation is easily supplied even in a relatively low temperature range.

When Ce sites are substituted with different atoms such as Bi having an ionic radius different from that of Ce, lattice distortion occurs, and this allows oxygen in the lattice to be easily emitted to the outside of the lattice. Also in such a case, it is considered that active oxygen necessary for oxidation is easily supplied even in a relatively low temperature range.

A description will next be given of a mechanism when part of Ce is substituted with a specific element. First, a description will be given of the case in which Bi is selected as a substituent element. In an oxide having a cerium oxide structure, when part of Ce is substituted with Bi, the effect of improving catalytic activity in a low-temperature range, i.e., the effect of lowering the combustion start temperature of PM, is achieved. The mechanism of such an effect is considered to be the same as the above-described mechanism in which the lattice distortion caused by substitution allows active oxygen to be easily supplied. It is considered that such lattice distortion also has the effect of preventing Bi in the crystal lattice from being released and therefore is effective for stabilization of the structure of the Ce oxide.

Even when the amount of Bi added is relatively small, the effect of improving the catalytic activity in the low-temperature range is achieved. However, if the amount of Bi added is too large, the effect is not enhanced but is saturated. There is rather a possibility that the catalyst material melts when exposed to high temperatures. In other words, there is a range of the appropriate amount of Bi to be added.

The reason for this may be that the addition of Bi having a low-melting point causes a reduction in the melting point of the complex oxide. Whether or not the amount of Bi added is appropriate can be known by the combustion start temperature of PM in a sample having been exposed to high temperatures for a long period of time and a change in the crystal structure of the sample. The amount of Bi added to the complex oxide was examined using the above-described evaluation method, and the ratio "a (molar ratio)" of the amount of Bi added was found to be in the range of preferably $0<a\leq0.4$, more preferably $0<a\leq0.3$, and still more preferably $0<a\leq0.1$.

If the ratio "a (molar ratio)" of the amount of Bi added exceeds 0.4, the PM combustion start temperature of a sample having been exposed to high temperatures for a long period of time increases. In this case, Bi atoms are likely to be released from the fluorite structure to form different phases such as Bi oxide or complex oxides of Bi and other additive elements, so that the complex oxide may contain impurity phases in an amount that inhibits the effects of the invention.

A description will next be given of the case in which part of the Ce element is substituted with Pr or Tb. When Ce is substituted with any of these elements, the original crystal structure of the cerium oxide, or the fluorite structure, is more likely to be maintained, and the effect of improving the heat resistance of the catalyst can be obtained. Preferably, Ce is substituted only with Pr because both a reduction in the PM combustion start temperature and an improvement in heat resistance can be achieved in a well balanced manner. However, part of Pr substituted for Ce may be further substituted with Tb. In this case, the ratio "b (molar ratio)" of the total amount of Pr and Tb added is $0<b\leq0.5$, preferably $0<b\leq0.3$, and still more preferably $0<b\leq0.2$.

A description will next be given of the case in which part of the Ce element is substituted with Zr, Al, Y, or Si. Substitution with any of these elements allows sintering of primary particles to be suppressed when the complex oxide is formed. Therefore, the specific surface area of the complex oxide can be increased. Moreover, as is clear from the fact that the effect of suppressing sintering is achieved, the heat resistance can be further improved. This is preferable because a catalyst sufficiently durable even in an actual use environment in which the catalyst is exposed to high temperatures for a long period of time can be provided.

Generally, the increase in the specific surface area leads to an improvement in catalytic activity and also increases the amount of sulfur necessary to cover the entire surface, so that allowance for sulfur poisoning can be increased. Therefore, it can be said that the increase in the specific surface area of the catalyst particles is essential for reducing a harmful influence (sulfur poisoning) caused by combustion of fuel for combustion of PM. Thus, the addition of the fourth element such as Zr that can impart high heat resistance even by addition of a small amount thereof is preferred because the improvement in catalytic activity and the resolution of the problem of a reduction in catalytic activity by sulfur poisoning can be achieved simultaneously. However, the addition of an excessive amount of such an element is not preferred because the Ce oxide cannot maintain the fluorite structure to cause a reduction in catalytic activity. Therefore, when such an element is added, the ratio "c (molar ratio)" of the amount thereof is $0<c\leq0.5$, preferably $0<c\leq0.4$, and still more preferably $0<c\leq0.3$.

According to the studies by the present inventors, for a catalyst composition in which a platinum group element was supported on the surface of the Ce oxide, almost no activity of removing noxious CO and HC contained in exhaust gas (noxious gas purification activity) inherent in the platinum group element was found, as shown in Comparative Examples 1 and 3 described later. As shown in Comparative Example 4 described later, for a catalyst composition in which platinum group elements were caused to adhere to the Ce oxide supporting alumina ($Al_2O_3$), the activity of removing CO and HC was not very high in a low-temperature range at an exhaust gas temperature of 200° C. It can be inferred from the above results that the state in which a platinum group element is supported directly on the Ce oxide and the state in which a platinum group element is supported on the surface of alumina reduce the activity of removing CO and HC in noxious gases.

In the structures of the catalysts for exhaust gas purification described in Patent Literatures 2 and 3, alumina is supported on the surfaces of oxygen absorbing-releasing material particles (a PM combustion catalyst in the present specification), and a platinum group element is further supported on the alumina. In these structures, the platinum group element is present not only on the surface of the alumina or in pores present on the alumina surface but also on the surface of the oxygen absorbing-releasing material. Therefore, it is inferred that the above-described state in which the platinum group element is supported directly on the PM combustion catalyst or the above-described state in which the platinum group element is supported on the surface of the alumina occurs.

In such a case, when the catalyst for exhaust gas purification undergoes heat history, it is considered that the platinum group element present in the alumina pores is less likely to migrate, but the platinum group element supported directly on the PM combustion catalyst and the platinum group element supported on the alumina surface easily migrate. Therefore, it is inferred that the platinum group element undergoes grain growth, and the activity of removing CO and HC is thereby reduced.

In addition, it is inferred that, in the state in which the entire surface of the PM combustion catalyst is covered with alumina, the PM and the PM combustion catalyst are prevented from coming into contact with each other and this causes deterioration in the effect of reducing the combustion start temperature of the PM. Accordingly, the above catalysts are not sufficient for diesel exhaust gas.

In the conventional noxious gas purification techniques, a catalyst for exhaust gas purification is often produced by simply mechanically mixing a complex oxide having PM combustion activity (oxygen absorbing-releasing material particles) and alumina supporting a platinum group element. However, according to the findings of the present inventors, when oxygen absorbing-releasing material particles are simply mixed mechanically with alumina supporting a platinum group element, the catalytic activity on noxious gases is reduced. For example, it is known that the catalyst exhibits its activity of removing CO and HC in an environment with an exhaust gas temperature of about 350° C. but the activity of removing CO and HC deteriorates in a low-temperature range at an exhaust gas temperature of 200° C.

More specifically, in a catalyst for exhaust gas purification prepared by mechanically mixing Pd-supporting alumina produced under the same conditions as in Example 4 with the same particles as those in Comparative Example 2 (a conventional sulfur poisoning resistant catalyst), a CO conversion rate at 200° C. was 12%, and a $C_3H_6$ conversion rate at 200° C. was about 7%, which were both insufficient.

In view of the above, the catalyst composition of the present invention is characterized by the form of the platinum group element supported on the PM combustion catalyst. More specifically, a component supporting the platinum group element intervenes between the PM combustion catalyst and the platinum group element. The intervening material is referred to as a "platinum group-supporting carrier" and is configured such that the platinum group element, which is a metal having noxious gas purification activity (hereinafter referred to also as an "active metal"), is dispersed in the entire interior of the platinum group-supporting carrier and supported thereby (dispersed in and supported by the platinum group-supporting carrier).

With the catalyst composition with this structure, high efficiency of removal of HC and CO is achieved even at low temperatures. In addition, the platinum group element is dispersed in and supported by the Al oxide and therefore firmly anchored by the Al oxide. Therefore, the platinum group element is less likely to migrate by heat applied from the outside, and the particles are thereby less likely to grow. More specifically, the noxious gas purification activity of the catalyst composition is less likely to be inactivated even after heating. Therefore, the catalyst composition is said to be a very good catalyst even from the viewpoint of effective utilization of resources.

Preferably, the above-described platinum group-supporting carrier is a porous oxide. The platinum group element is dispersed in the entire interior of the platinum group-supporting carrier and supported thereby. This structure is employed because the platinum group element must come into contact with noxious gases such as CO and $C_3H_6$ contained in an exhaust gas in order to achieve noxious gas purification activity.

The platinum group-supporting carrier elements constituting the platinum group-supporting carrier include at least one kind of element selected from Zr, Al, Y, Si, Bi, Pr, and Tb. Al is particularly preferably used. When Al, for example, is used, a platinum group-supporting carrier in the form of alumina ($Al_2O_3$) is preferably used. Alumina is less likely to be altered and deteriorate even when exposed to high temperatures, is not reacted with the Ce oxide and the platinum group element, and can be formed into a porous form. The use of such a structure allows a catalyst composition satisfying both PM combustion activity at low temperatures and noxious gas purification activity to be provided. For convenience, in the present specification, Al is described as the element constituting the platinum group-supporting carrier. However, when another element is selected, Al is read as the element used.

When the ratio of the amount of the platinum group-supporting carrier to the amount of the catalyst composition is high, the entire surface of the Ce oxide serving as the PM combustion activity catalyst is covered thick with the platinum group-supporting carrier. Then PM is less likely to come into direct contact with the Ce oxide, and this causes a reduction in PM combustion activity. Therefore, the amount of Al must be adjusted appropriately. Specifically, the ratio "d (molar ratio)" of the amount to be added is $0<d\leq0.3$, preferably $0<d\leq0.2$, more preferably $0<d\leq0.1$, and most preferably $0<d\leq0.05$.

Particularly, the active metal is at least one kind of platinum group element selected from Pt, Rh, and Pd, and a plurality of platinum group elements may be used simultaneously. Particularly, the use of Pt and Pd simultaneously is preferred because CO and $C_3H_6$ can be purified simultaneously. When the platinum group element is present directly on the Ce oxide, the grains of the platinum group element grow at high temperatures, and its gas purification activity deteriorates. Therefore, the platinum group element is dispersed in and supported by the platinum group-supporting carrier. The amount of the platinum group element added with respect to the total mass of the catalyst composition is 5.0% by mass or lower, preferably 3.0% by mass or lower, and more preferably 2.0% by mass or lower. A large amount of the platinum group is not preferred because cost becomes too high, and the catalyst composition is industrially unsuitable.

The existence forms of the platinum group element/platinum group-supporting carrier/Ce oxide can be determined by performing Ar gas sputtering from the surface thereof to examine the ratio of the elements in a thickness direction by, for example, ESCA (Electron Spectroscopy for Chemical Analysis). Alternatively, whether or not the catalyst composition has such a structure can be determined, for example, by cutting an aggregate of the catalyst composition by ion milling etc. and subjecting an alumina-adhering portion of the cut area to element mapping by SEM-EDX (Scanning Electron Microscope-Energy Dispersive X-ray spectrometry) or TEM-EDX (Transmission Electron Microscope-Energy Dispersive X-ray spectrometry).

The catalyst according to the present invention may be subjected to qualitative analysis using X-rays. More specifically, when the catalyst composition according to the present invention is subjected to powder X-ray diffraction measurement using Co—Kα characteristic X-rays, weak absorption due to the active metal may appear. For example, when Pd and Pt are used in combination, a broad peak appears around $2\theta=47°$. The form of the metals when Pd and Pt are used is not clear because the peak obtained is broad. However, the peak is not due to the two constituent platinum group elements and observed in an intermediate portion between the characteristic peaks of these elements. Therefore, the form of the metals may be an alloy form or a form similar thereto.

With the above-described structure, a catalyst composition having both the PM combustion activity of the Ce oxide and noxious gas purification activity can be formed.

A method for producing the catalyst composition of the present invention will next be described in detail. In this production method, a step of mixing, in a liquid, a platinum group element and at least one kind of element selected from Zr, Al, Y, Si, Bi, Pr, and Tb to obtain a hydroxide gel, a step of adding a Ce oxide to the hydroxide gel to cause the hydroxide gel to adhere to the surface of the Ce oxide, and a step of subjecting the Ce oxide with the hydroxide gel adhering thereto to heat treatment are performed to obtain a catalyst composition.

<Method for Producing Ce Oxide>

The Ce oxide used in the present invention can be obtained by, for example, a coprecipitation method, an organic complex method, a solid phase method, or a method through an amorphous precursor. No particular limitation is imposed on the method for obtaining the Ce oxide. However, with the method for obtaining the Ce oxide through an amorphous precursor, a large amount of Ce oxide can be easily obtained. Therefore, this method is industrially advantageous and will be described as a production example in detail.

Raw material salts, which are mainly water-soluble salts, such as nitrates, sulfates, and chlorides of components corresponding to Ce, Bi, Pr (Tb), Zr (Al, Y, Si) are prepared at a prescribed ratio. An alkali used as a precipitant is added to an aqueous solution of these raw material salts to allow the mixture to react, and air is blown into the resultant mixture for oxidation.

Preferably, to obtain a precipitate, one or both of an alkali hydroxide and an alkali carbonate are used. Specific examples of the alkali hydroxide used include sodium hydroxide and ammonia water, and specific examples of the alkali carbonate used include materials composed mainly of carbonic acid such as carbonated water, carbonic acid gas, sodium carbonate, potassium carbonate, and sodium hydrogencarbonate. Preferably, a mixture of a material composed mainly of carbonic acid and a material such as ammonia water or a water soluble salt of ammonium is used. Alternatively, an ammonium carbonate compound having the functions of both the above materials such as ammonium carbonate or ammonium hydrogen carbonate is preferably used.

The precipitate can also be obtained as follows. Urea is allowed to be contained in the salt solution, and the resultant salt solution is heated to decompose the urea, thereby generating ammonia. Then, the salt solution becomes alkaline to thereby obtain the precipitate. Preferably, the pH of the solution when the precipitate is generated is controlled in the range of 6 to 11. The range in which the pH is less than 6 is not preferred because Bi, Ce, Pr, and R may not co-precipitate.

If necessary, the obtained precipitate is filtrated, washed with water, and dried by vacuum drying or air drying to obtain an amorphous precursor. In this process, to improve the dewatering effect during drying, the precipitate immediately after filtration as is may be subjected to the drying treatment, or the precipitate having been granulated into a prescribed shape may be subjected to the drying treatment. Then the amorphous precursor in a powder form or in a granulated form is subjected to heat treatment (firing) at, for example, 400 to 1,000° C. and preferably 500 to 850° C., and the intended Ce oxide can thereby be synthesized. No particular limitation is imposed on the atmosphere during firing so long as the Ce oxide can be formed. For example, an atmosphere such as air, nitrogen, argon, or a combination of any of these with water vapor may be used.

<Dispersion and Support of Platinum Group Element Using Platinum Group-Supporting Carrier and its Adhesion to Ce Oxide>

A platinum group element which is Pt, Rh, Pd, or a combination thereof and at least one kind of element, which is a platinum group-supporting carrier element, selected from Zr, Al, Y, Si, Bi, Pr, and Tb are mixed in a liquid to obtain a hydroxide gel. Then the Ce oxide is added to the solution to cause the hydroxide gel containing the platinum group element and the platinum group-supporting carrier element to adhere to the surface of the Ce oxide.

A specific method will be exemplified below. An aqueous solution with its pH adjusted to 11 to 12, a solution of a salt of the platinum group element, and a solution of a salt of Al are mixed, and the pH of the solution mixture is adjusted to 3 to 9 and preferably 3 to 6 to allow a precipitate (hereinafter referred to as a "hydroxide gel") to form. The solution of the salt of the platinum group element and the solution of the salt of Al may be used as a solution mixture. Then the Ce oxide obtained by the above-described method is added, and the resultant mixture is stirred and left to stand to cause the hydroxide gel composed of Al and the platinum group element to adhere to the Ce oxide.

This procedure allows Al and the platinum group element to adhere to the Ce oxide. Although the details are unclear, it is considered that the Al component captures the platinum group component and then adheres to the Ce oxide with the platinum group component being captured and the structure according to the invention is thereby obtained. The reaction is performed in the range of 30 to 90° C., and it is sufficient that the process is performed for 30 to 180 minutes under stirring.

<Heat Treatment>

The above-obtained Ce oxide with the hydroxide gel adhering thereto is filtrated, washed, and dried. Then the Ce oxide in a powder form is fired for 1 to 4 hours at, for example, 500 to 1,000° C. and preferably 600° C. to 850° C., and the intended catalyst composition can thereby be obtained. This catalyst composition has a structure in which the platinum group-supporting carrier with the platinum group element dispersed therein and supported thereby is supported on the surface of the Ce oxide. The catalyst composition has PM combustion activity and therefore serves as a PM combustion catalyst. The catalyst composition also has noxious gas purification activity and therefore serves also as a noxious gas purification catalyst.

The thus obtained catalyst composition can be used after supported on, for example, a DPF. As is well known, a diesel particulate filter (DPF) is a filter to be disposed in an exhaust gas system of a diesel engine and is a filter for trapping PM (soot).

A more specific example will be described. A DPF has a tubular shape with a honeycomb cross section as viewed from an inlet side and is formed of a porous ceramic material. No direct through holes are provided between the inlet side (also referred to as an "engine side") and an outlet side (also referred to as an "open-air side"), and the porous ceramic forms a filter. Specifically, any of ceramics, cordierite, silicon carbide (SiC), aluminum titanate, etc. is preferably used as the porous ceramic. As described above, no particular limitation is imposed on the shape of the porous ceramic, and the porous ceramic may have a foam shape, a mesh shape, or a plate shape. When the catalyst composition of the present invention is supported on such a DPF, trapped PM can be combusted, and also noxious gases such as CO, HC, and $NO_X$ can be purified.

Preferably, to support the catalyst composition of the present invention on the DPF, the catalyst composition is formed as a coating, and the coating is applied to the DPF using a so-called wash coating method. The coating used when the wash coating method is used to support the catalyst composition is composed of the catalyst composition of the present invention, a solvent, and an inorganic binder. The coating may optionally contain a dispersant, a viscosity modifier, and a pH modifier.

The solvent used may be a polar solvent or a non-polar solvent. To quickly dry the coating after application to the filter, a solvent having a low boiling point is preferred. However, from the viewpoint of ease of handling, a water-based solvent may also be used. More specifically, any of water, isopropyl alcohol, terpineol, 2-octanol, butyl carbitol acetate, etc. can be preferably used.

A powder of $Al_2O_3$, $TiO_2$, $SiO_2$, $ZrO_2$, etc. can be preferably used as the inorganic binder. This is because, since the PM combustion catalyst is exposed to high temperatures, a material having stable characteristics even at high temperatures is preferred. The above-described components are mixed, and a coating including the catalyst composition of the present invention can thereby be obtained.

Preferably, the catalyst composition of the present invention is supported on the engine-side face of the DPF that is on the engine side after installation of the DPF. This is because, since the catalyst composition of the present invention serves also as a PM combustion catalyst, the PM combustion temperature cannot be reduced unless the catalyst composition is disposed on the engine side on which the PM is accumulated.

The DPF supporting the catalyst composition of the present invention can be used for any known exhaust gas purification system without any treatment. This is because the catalytic activity is not inactivated by heat and materials discharged to the exhaust system of a diesel engine. Since the DPF supporting the catalyst composition of the present invention exhibits PM combustion activity even at relatively low temperatures, heating means for combusting the PM may be lightened. With the catalyst composition of the present invention, since the DPF itself has the ability to purify noxious gases, a device for reducing HC, CO, and NOx can be lightened, and this may indirectly contribute to an improvement in fuel consumption.

<Evaluation of PM Combustion Activity>

The catalytic activity on PM was evaluated by measuring the PM combustion temperature as follows. Commercial carbon black (manufactured by Mitsubishi Chemical Corporation, average particle diameter: 2.09 μm) was used as simulated PM. A powder sample of the catalyst composition and the carbon black were weighed such that their mass ratio was 30:1. They were placed in a micro-tube with a volume of 1.5 mL and mixed using a test tube mixer TRIO (type: TM-1, manufactured by AS ONE Corporation) for 3 minutes to obtain a powder mixture of to the carbon black and each powder sample. 10 mg of the powder mixture was placed in a TG/DTA apparatus (type: TG/DTA6300, manufactured by Seiko Instruments Inc.) and heated in air from room temperature to 800° C. at a temperature rise rate of 10° C./min, and the temperature at which the mass started decreasing was measured as the PM combustion temperature.

<Evaluation of Noxious Gas Purification Activity>

A powder sample of the catalyst composition was molded into a pellet shape using a molding apparatus at an applied pressure of 100 kgf/cm² and pulverized on sieves with meshes of 500 μm and 250 μm placed in that order. 0.26 cc of the obtained aggregates of the catalyst composition of 250 μm to 500 μm were measured and placed in a tube furnace into which propylene gas, oxygen, and nitrogen used as simulated exhaust gas containing CO and HC were allowed to flow. A gas mixture of 300 ppm of CO, 140 ppm of propylene gas, 11% of oxygen, and nitrogen was introduced into the tube furnace at a flow rate of 10 L/min, and the temperature of the tube furnace was increased from room temperature to a measurement temperature at a temperature rise rate of 10° C./min to measure the rates of reduction in the amounts of CO and HC.

<Composition Analysis>

Surface analysis was performed by X-ray photoelectron spectroscopy (ESCA), and the results of the measurement are shown. The measurement was performed using 5800 manufactured by ULVAC-PHI, Inc. under the conditions of a take-off angle of 45°, and a sample set on a holder was placed in the apparatus. A scanning speed was 5 eV/min, and the rate of etching was 2 nm/cycle (in terms of $SiO_2$).

Analysis of the overall composition was performed using a high-frequency plasma emission spectrometer (IRIS/AP) manufactured by Nippon Jarrell-Ash Co. Ltd. Since the quantitative analysis results are given in terms of percent by mass, the results were converted to atomic percent (represented by at %) when computation was performed.

<X-Ray Diffraction Measurement>

A sample of the obtained catalyst composition was pulverized in an agate mortar into a powder, and X-ray diffraction measurement was performed on the powder. Specifically, the apparatus used was RINT-2100 (manufactured by Rigaku Corporation). A Co X-ray tube (characteristic X-rays: Co—Kα rays (wavelength: 1.78892 angstroms)) was used under the conditions of a tube voltage of 40 kV and a tube current of 30 mA. A scanning speed was set to 1.0°/min, a sampling width was set to 0.02°, diverging and scattering slits were set to 1°, and a light-receiving slit was set to 0.3 mm. The measurement was performed while the sample was rotated.

Since a peak due to the active metal (platinum group element) is small, identification is not easy. However, when a single platinum group element is used, a diffraction peak due to the active metal appears around the strongest diffraction line inherent in the element. When a plurality of platinum group elements are used, a diffraction peak due to the active metals appears between the strongest diffraction line of the first element and the strongest diffraction line of the second element. Therefore, such a peak was used for determination.

<Measurement of Chemical Reduction Rate (Amount of Oxygen Released)>

The chemical reduction rate was measured using a TG apparatus. 15 mg of a powder was placed in the TG/DTA apparatus (type: TG/DTA6300, manufactured by Seiko Instruments Inc.) and heated in air from room temperature to a measurement temperature (300° C. in the present invention) at a temperature rise rate of 10° C./min. After completion of temperature rise, the powder was maintained at that temperature for 10 minutes. Then the atmosphere (air) was replaced with nitrogen over 5 minutes. Next, a flow of a gas mixture composed of 2% of hydrogen and 18% of helium with the balance being nitrogen was allowed to flow for 10 minutes, and the reduction in mass of the powder was monitored to determine the amount of oxygen released from the structure of the powder at the measurement temperature.

When the amount released increases in a short time, the chemical reduction rate is high, i.e., oxygen is more likely to be released. This indicates that oxygen accumulated in the structure of the catalyst composition is released at once. This property is considered to provide an increased ability to ignite PM accumulated on the DFP, but the ability to continuously combust the PM is low. If oxygen is released at once from the catalyst composition supported on the DPF and the accumulated PM is combusted at one time, the possibility of damage to (burnout of) the filter becomes high. Therefore, the chemical reduction rate, i.e., oxygen supply performance, is preferably low so that oxygen can continuously be supplied. In other words, the chemical reduction rate is preferably as low as possible.

<Quantification of Chemical Reduction Rate>

The chemical reduction rate can be determined from a mass reduction curve in TG given as a reduction in the amount of oxygen. For example, the "chemical reduction rate "($V_{Red:2}$)" can be quantified from the rate of reduction in the amount of oxygen released using the following formula (1).

Chemical reduction rate ($V_{Red:2}$)={mass of catalyst composition (mg)−mass after two minutes from start of measurement (mg)}/mass of catalyst composition (mg)/time from start of measurement (2 minutes)×100×(−1)  (1)

Figure 3:
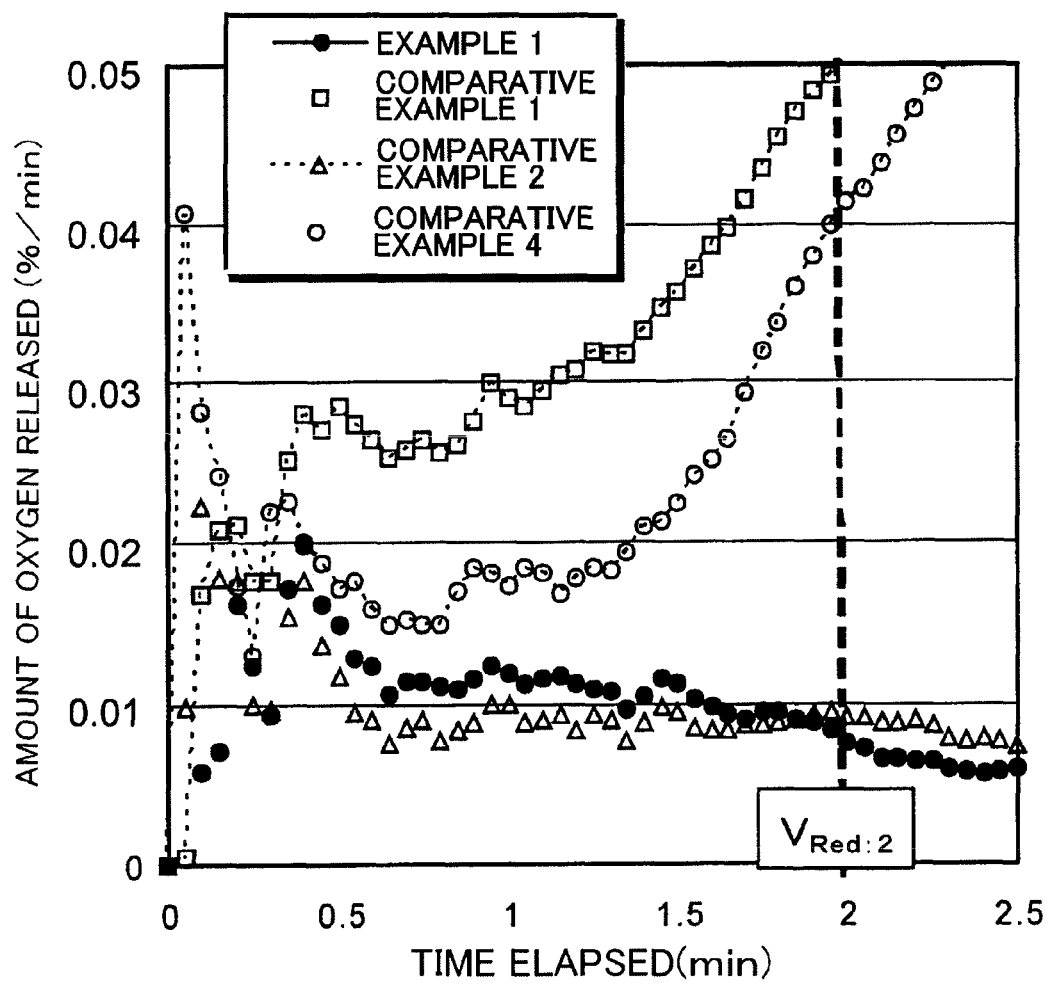
FIG. 3 is a graph showing chemical reduction rate (the amount of oxygen released) versus elapsed time in the TG measurement for Example 1 and Comparative Examples 1, 2, and 4.

In the formula (I), the "mass of catalyst composition (mg)—mass after two minutes from start of measurement (mg)" represents the amount of mass reduction (a negative value) in the TG measurement. In addition, in the formula (I), the mass after 2 minutes from the start of the measurement is used in order to eliminate the instability of the initial mass reduction. In FIG. 3, the chemical reduction rate is represented as the "amount of oxygen released." However, the amount of oxygen released is equivalent to the "chemical reduction rate," and their units are the same.

EXAMPLES

Example 1

<Preparation of Oxide>

Cerium nitrate hexahydrate ($Ce(NO_3)_3 \cdot 6H_2O$) used as a Ce source, bismuth nitrate pentahydrate ($Bi(NO_3)_3 \cdot 5H_2O$) used as a Bi source, and zirconium nitrate ($Zr(NO_3)_2$) used as a zirconium source were prepared. Pr was selected as a rare-earth component, and an aqueous nitric acidic solution of praseodymium oxide was prepared.

The above-described raw materials were mixed in a molar ratio of Ce:Bi:Pr:Zr=0.795:0.005:0.150:0.050, and pure water was added to the mixture such that the total concentration of Ce, Bi, Pr, and Zr was 0.20 mol/L to thereby obtain a raw material solution.

An aqueous $NH_3$ solution used as a precipitant was added to the raw material solution under stirring to form hydroxides. Then the reaction mixture was held at a high temperature of 50° C., and an oxidation gas with an oxygen concentration of 9.0% was blown into the reaction mixture for 150 minutes to oxidize and stabilize the hydroxide mixture in the solution.

The obtained precipitate was filtrated, washed with water, and dried at 125° C. for 15 hours to obtain a dried powder. The obtained powder is referred to as a Ce oxide precursor. Next, the Ce oxide precursor was fired in air at 800° C. for 2 hours to obtain an oxide composed of Ce, Bi, Pr, and Zr, i.e., a Ce oxide having PM combustion activity.

<Pre-Preparation of Adhesion Treatment Solution>

First, 1.13 g of aluminum nitrate nonahydrate $Al(NO_3)_3 \cdot 9H_2O$, 18.07 g of a nitric acid solution of palladium (Pd concentration: 0.83% by mass), and 1.77 g of a $Pt(NH_3)_2(NO_2)_2$ solution (Pt concentration: 8.477% by mass, manufactured by TANAKA KIKINZOKU KOGYO K.K.) were mixed with 200 mL of pure water to prepare an adhesion treatment solution containing a mixture of aluminum, palladium, and platinum.

<Mixing of Platinum Group Elements into Platinum Group-Supporting Carrier and Adhesion of Platinum Group-Supporting Carrier>

800 mL of an alkaline aqueous sodium hydroxide solution with a pH of 11 adjusted by sodium hydroxide was poured into a 1 L beaker, and the temperature of the solution was maintained at 40° C.

The above adhesion treatment solution was added at once to the sodium hydroxide solution, and an acidic solution with a pH of 3.5 was obtained. Then the obtained acidic solution was stirred for 30 minutes with its temperature maintained at 40° C. to form a hydroxide gel in which palladium and platinum had been mixed into an aluminum hydroxide gel.

Then 20 g of the Ce oxide prepared by the above-described method was added, and the mixture was stirred for 30 minutes.

The thus obtained solution containing the hydroxide gel and the Ce oxide was filtrated under a suction pressure of 32 mm Hg and washed with water. A paper filter with the ability to retain particles of 2.7 μm was used for the filtration. The washing was performed with pure water at 30° C. Then the obtained material was collected and dried in air at 125° C. for 6 hours to obtain the dried Ce oxide with the mixture of aluminum, palladium, and platinum adhering thereto.

<Heat Treatment>

The above dried product was treated in air at 800° C. for 2 hours to obtain a catalyst composition in this Example in which alumina ($Al_2O_3$) had been supported on areas of the surfaces of the particles of the Ce oxide and palladium and platinum had been dispersed in and supported by the alumina ($Al_2O_3$).

<Composition Analysis>

The obtained catalyst composition was found to be particles containing 0.34% by mass of aluminum, 0.75% by mass of palladium, and 0.69% by mass of platinum (the ratio of platinum group elements/(aluminum+platinum group elements) is 0.81), as shown in TABLE 1. This composition ratio was computed by analyzing the catalyst composition dissolved by a mixed acid of aqua regia and sulfuric acid and diluted using ICP (SPS 3520V, manufactured by SII Nano-Technology Inc.). The same applies to the following Examples and Comparative Examples.

<X-Ray Diffraction Measurement>

The obtained catalyst composition was subjected to X-ray diffraction measurement. The results are shown in FIG. 1. In FIG. 1, the vertical axis represents the detected intensity (arbitrary unit), and the horizontal axis represents an angle (2θ). The upper part (a) shows the results of Example 1, and the lower part (b) shows the results of Comparative Example 1 in which no platinum group-supporting carrier was used. As shown in the upper part (a) of FIG. 1, a weak diffraction line was observed around 2θ=47°. When no hydroxide gel (no platinum group-supporting carrier) was used as in Comparative Example 1, no diffraction line appeared because the platinum group elements solid-dissolved in the $CeO_2$ structure.

<Measurement of Combustion Start Temperature>

The combustion start temperature of the above catalyst composition was examined, and the catalyst composition was found to have high activity, i.e., to be capable of initiating combustion even at a low temperature of 360.1° C. The gas purification activity on the simulated exhaust gas was found to be high, i.e., the CO conversion rate at 200° C. was 61.9%, and the $C_3H_6$ conversion rate at 200° C. was 31.2%.

<Chemical Reduction Rate: TG Measurement>

The chemical reduction rate ($V_{Red:2}$) was computed using the above-described formula (I) using the amount of the catalyst composition of 15 mg and the reduction in the amount after 2 minutes from the start of the measurement of 2.2 μg (=2.2×10$^{-3}$ mg), and was found to be 0.007%/min.

As shown in the graph of FIG. 3, the temporal changes in the chemical reduction rate ($V_{Red:2}$) were different for different catalyst compositions. More specifically, the reduction in the amount of oxygen may be considered to occur such that oxygen easily released from the crystal structure is first released and then oxygen not easily released is released. Therefore, the chemical reduction rate may be evaluated in different stages, and the chemical reduction rate in a stage in which oxygen is easily released may be compared with the chemical reduction rate in a stage in which oxygen is not easily released to compare the releasability of oxygen. From the viewpoint of the long term continuous use of the catalyst composition, it is preferable that the chemical reduction rate ($V_{Red:2}$) be as small as possible from the beginning. Therefore, the average chemical reduction rate ($V_{Red:2}$) from the start of the measurement to 2 minutes after the start is preferably 0.03%/min or lower and more preferably 0.01% or lower.

Example 2

A catalyst composition in this Example was obtained by repeating the same procedure as in Example 1 except that, in the preparation of the adhesion treatment solution used in Example 1, 8.51 g of aluminum nitrate nonahydrate Al(NO$_3$)$_3$.9H$_2$O was used. More specifically, the influence of increasing the amount of Al in Example 1 was examined.
<Composition Analysis>
The obtained catalyst composition was found to be particles containing 1.66% by mass of aluminum, 0.70% by mass of palladium, and 0.61% by mass of platinum (the ratio of platinum group elements/(aluminum+platinum group elements) is 0.44), as shown in TABLE 1.
<Measurement of Combustion Start Temperature>
The combustion start temperature of the above catalyst composition was examined, and the catalyst composition was found to have high activity, i.e., to be capable of initiating combustion even at a low temperature of 375.2° C. The gas purification activity on the simulated exhaust gas was found to be relatively high, i.e., the CO conversion rate at 200° C. was 52.1%, and the C$_3$H$_6$ conversion rate at 200° C. was 26.8%.

Example 3

A catalyst composition in this Example was obtained by repeating the same procedure as in Example 1 except that, in the preparation of the adhesion treatment solution used in Example 1, 21.27 g of aluminum nitrate nonahydrate Al(NO$_3$)$_3$.9H$_2$O was used. More specifically, the influence of increasing the amount of Al in Example 2 was examined.
<Composition Analysis>
The obtained catalyst composition was found to be particles containing 4.1% by mass of aluminum, 0.68% by mass of palladium, and 0.62% by mass of platinum (platinum group elements/(aluminum+platinum group elements)=0.24), as shown in TABLE 1.
<Measurement of Combustion Start Temperature>
The combustion start temperature of the above catalyst composition was examined, and the catalyst composition was found to have high activity, i.e., to be capable of initiating combustion even at a low temperature of 380.4° C. The gas purification activity on the simulated exhaust gas was found to be relatively high, i.e., the CO conversion rate at 200° C. was 48.3%, and the C$_3$H$_6$ conversion rate at 200° C. was 20.5%.

Example 4

In the preparation of the adhesion treatment solution used in Example 1, 0.29 g of aluminum nitrate nonahydrate Al(NO$_3$)$_3$.9H$_2$O and 1.54 g of a palladium solution (concentration: 5.19% by mass) were dissolved in 200 mL of pure water to prepare an adhesion treatment solution containing aluminum and palladium mixed therein. Then the same procedure as in Example 1 was repeated using this adhesion treatment solution to obtain a catalyst composition in this Example in which alumina (Al$_2$O$_3$) had adhered to at least part of the particle surfaces and palladium had been dispersed in and supported by the alumina (Al$_2$O$_3$).
<Composition Analysis>
The obtained catalyst composition was found to be particles containing 0.11% by mass of aluminum and 0.39% by mass of palladium (the ratio of platinum group element/(aluminum+platinum group element) is 0.80), as shown in TABLE 1.
<Measurement of Combustion Start Temperature>
The combustion start temperature of the above catalyst composition was examined, and the catalyst composition was found to have high activity, i.e., to be capable of initiating combustion even at a low temperature of 377.0° C. The gas purification activity on the simulated exhaust gas was found to be relatively high, i.e., the CO conversion rate at 200° C. was 71.0%, and the C$_3$H$_6$ conversion rate at 200° C. was 22.0%.

Comparative Example 1

A catalyst powder in this Example was obtained by repeating the same procedure as in Example 1 except that no Al component was added. The combustion start temperature was found to be as low as 349.7° C., as shown in TABLE 1. However, the activity on the simulated exhaust gas in a low-temperature range was low. The CO conversion rate at 200° C. was only 9.8%, and the C$_3$H$_6$ conversion rate at 200° C. was only 1.4%. This shows that, by simply supporting the gas active components on the surface, the effects obtained by the catalyst compositions in the Examples cannot be achieved.
The chemical reduction rate ($V_{Red:2}$) was computed as in Example 1 using the reduction in the amount after 2 minutes from the start of the measurement of 15.1 µg=15.1×10$^{-3}$ mg and the amount of the catalyst powder of 15 mg, and was found to be 0.05%/min.
<X-Ray Diffraction Measurement>
The obtained powder was subjected to X-ray diffraction measurement. As shown in the lower part (b) of FIG. 1, although the chemical composition of the catalyst composition was similar to that in Example 1, no diffraction peak was to observed around 2θ=47°.

Comparative Example 2

Only the PM combustion catalyst (Ce oxide) was evaluated without adhesion of a platinum group element and aluminum thereto. As shown in TABLE 1, the combustion start temperature was as low as 357.0° C. However, the activity on the simulated exhaust gas in a low-temperature range was low. The CO conversion rate at 200° C. was 5.4%, and the C$_3$H$_6$ conversion rate at 200° C. was 1.4%. Therefore, almost no noxious gas purification activity was found.
The chemical reduction rate ($V_{Red:2}$) was computed as in Example 1 using the reduction in the amount after 2 minutes from the start of the measurement of 2.7 µg=2.7×10$^{-3}$ mg and the amount of the PM catalyst of 15 mg, and was found to be 0.009%/min.

Comparative Example 3

Aluminum used in Example 4 was not used, and the platinum group element (palladium) was directly supported on the Ce oxide. The obtained catalyst powder was evaluated. More specifically, in the preparation of the adhesion treatment solution in Example 4, 1.65 g of a palladium solution (concentration: 4.84% by mass) was dissolved in 200 mL of pure water to prepare an adhesion treatment solution containing palladium mixed therein. Then the same adhesion operation as in Example 4 (Example 1) was repeated to obtain the catalyst powder in this Example.

As shown in TABLE 1, the combustion start temperature was low (356.6° C.). However, the activity on the simulated exhaust gas in a low-temperature range was low. The CO conversion rate at 200° C. was only 22.1%, and the $C_3H_6$ conversion rate at 200° C. was only 5.5%. This shows that, when the catalyst powder is supported directly on the Ce oxide, the activity for noxious gas purification is lower than that of the catalyst compositions obtained in the Examples.

Comparative Example 4

Adhesion of Al and adhesion of the platinum group elements in Example 1 were performed separately. More specifically, an aqueous aluminum nitrate solution was prepared as a first adhesion treatment solution and added to pure water having been adjusted to alkaline by sodium hydroxide to thereby obtain an aluminum hydroxide gel. Then, 20 g of the same Ce oxide as in Example 1 was added to the aluminum hydroxide gel, and they were mixed for 30 minutes to cause the aluminum hydroxide gel to adhere to the surface of the Ce oxide.

The thus obtained Ce oxide with aluminum adhering to its surface was filtrated under a suction pressure of 32 mm Hg and washed with water. A paper filter with the ability to retain particles of 2.7 μm was used for the filtration. The washing was performed with pure water at 30° C. Then the obtained material was collected and dried in air at 125° C. for 6 hours to obtain the dried Ce oxide with aluminum adhering thereto.

The dried product was treated in air at 800° C. for 2 hours to obtain an oxide with alumina ($Al_2O_3$) supported on areas of the surfaces of the particles.

The platinum solution and the aqueous palladium solution were added in the same amounts as in Example 1 to 800 mL of an aqueous sodium hydroxide solution adjusted to alkaline, of which pH was 11 to 12, by sodium hydroxide, and then the above-obtained alumina-supporting oxide was added. The mixture was stirred for 30 minutes while the temperature of the solution was maintained at 40° C. Then the particles with aluminum adhering to the Ce oxide and platinum and palladium adhering thereto in this order was filtrated, washed, dried, and subjected to heat treatment in the same manner as described above to obtain a catalyst powder in this Example.

The combustion start temperature of the catalyst powder was examined, and the activity was found to be high, i.e., combustion was started even at a low temperature of 358.6° C. However, the activity on the simulated exhaust gas was relatively low, i.e., the CO conversion rate at 200° C. was as low as 34.0%, and the $C_3H_6$ conversion rate at 200° C. was 18.0%.

The chemical reduction rate ($V_{Red:2}$) was computed as in Example 1 using the reduction in the amount after 2 minutes from the start of the measurement of 11.8 μg=11.8×10$^{-3}$ mg and the amount of the catalyst powder of 15.2 mg, and was found to be 0.039%/min. The elemental composition in Comparative Example 4 is very similar to that in each of the Examples of the present invention in that the platinum group elements and alumina are supported on the surface of the Ce oxide. In each Example of the present invention, the platinum group-supporting carrier with the platinum group element dispersed therein and supported thereby is supported on the surface of the Ce oxide. However, in Comparative Example 4, alumina is first supported on the surface of the Ce oxide, and then the platinum group elements are supported on the alumina. The difference in noxious gas purification activity between Comparative Example 4 and each of the Examples of the subject application may be due to the above-described difference in structure. In TABLE 1, the noxious gas purification activity is described simply as "gas activity."

TABLE 1

| | COMPOSITION (% BY MASS) | | | RATIO OF PLATINUM GROUP ELEMENTS TO COATING COMPONENTS | COMPOSITION (MOLE FRACTION) | | | RATIO OF PLATINUM GROUP ELEMENTS TO COATING COMPONENTS | CATALYTIC ACTIVITY | | | | |
|---|---|---|---|---|---|---|---|---|---|---|---|---|---|
| | | | | | | | | | PM COMBUSTION START TEMP. | GAS ACTIVITY | | | |
| | | | | | | | | | | CO CONVERSION RATE (%) | | $C_3H_6$ CONVERSION RATE (%) | |
| | Pt | Pd | Al | | Pt | Pd | Al | | ° C. | 200° C. | 350° C. | 200° C. | 350° C. |
| EXAMPLE 1 | 0.69 | 0.75 | 0.34 | 0.81 | 0.006 | 0.012 | 0.022 | 0.45 | 360.1 | 61.9 | 91.1 | 31.2 | 79.6 |
| EXAMPLE 2 | 0.61 | 0.70 | 1.66 | 0.44 | 0.005 | 0.011 | 0.100 | 0.14 | 375.2 | 52.1 | 90.5 | 26.8 | 79.8 |
| EXAMPLE 3 | 0.62 | 0.68 | 4.10 | 0.24 | 0.005 | 0.009 | 0.223 | 0.06 | 380.4 | 48.3 | 88.5 | 20.5 | 72.4 |
| EXAMPLE 4 | — | 0.39 | 0.11 | 0.80 | — | 0.006 | 0.007 | 0.46 | 377.0 | 71.0 | 88.0 | 22.0 | 65.0 |
| COMPARATIVE EXAMPLE 1 | 0.71 | 0.74 | — | — | 0.006 | 0.012 | — | — | 349.7 | 9.8 | 62.9 | 1.4 | 45.9 |
| COMPARATIVE EXAMPLE 2 | — | — | — | — | — | — | — | — | 357.0 | 5.4 | 20.0 | 1.4 | 13.2 |
| COMPARATIVE EXAMPLE 3 | — | 0.40 | — | — | — | 0.007 | — | — | 356.6 | 22.1 | 71.9 | 5.5 | 35.9 |
| COMPARATIVE EXAMPLE 4 | 0.69 | 0.75 | 0.34 | 0.81 | 0.006 | 0.011 | 0.023 | 0.43 | 358.6 | 34.0 | 76.0 | 18.0 | 61.9 |

Figure 2:
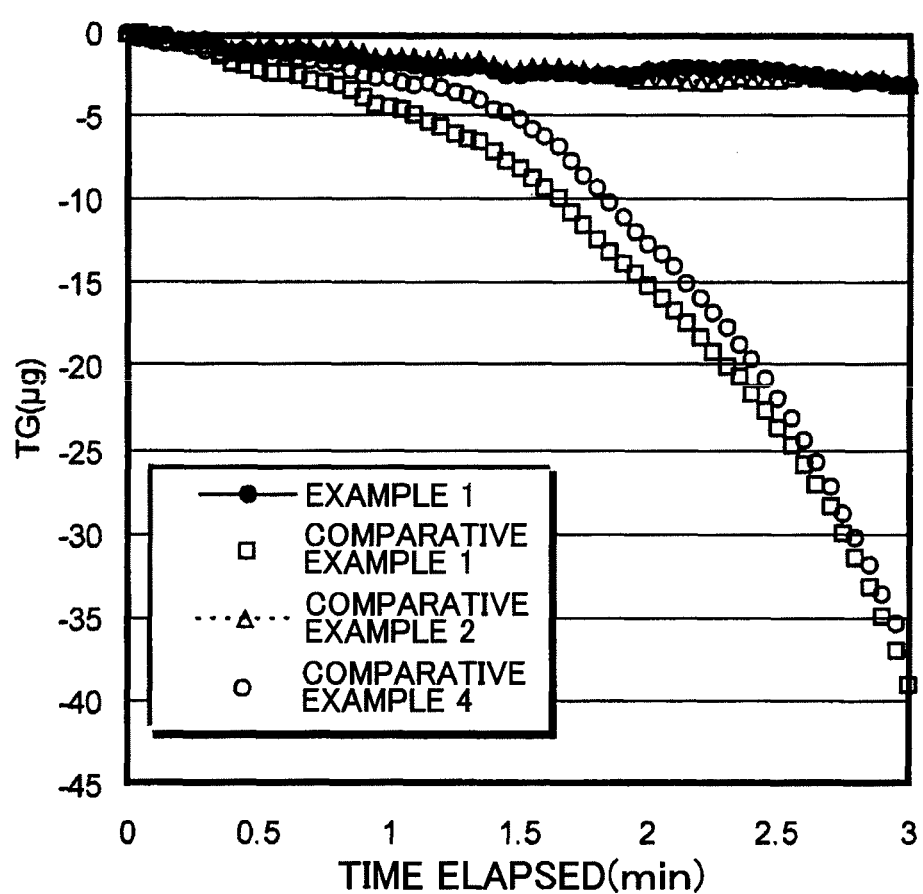
FIG. 2 is a graph showing a reduction in mass versus elapsed time in TG measurement for Example 1 and Comparative Examples 1, 2, and 4.
Figure 4:
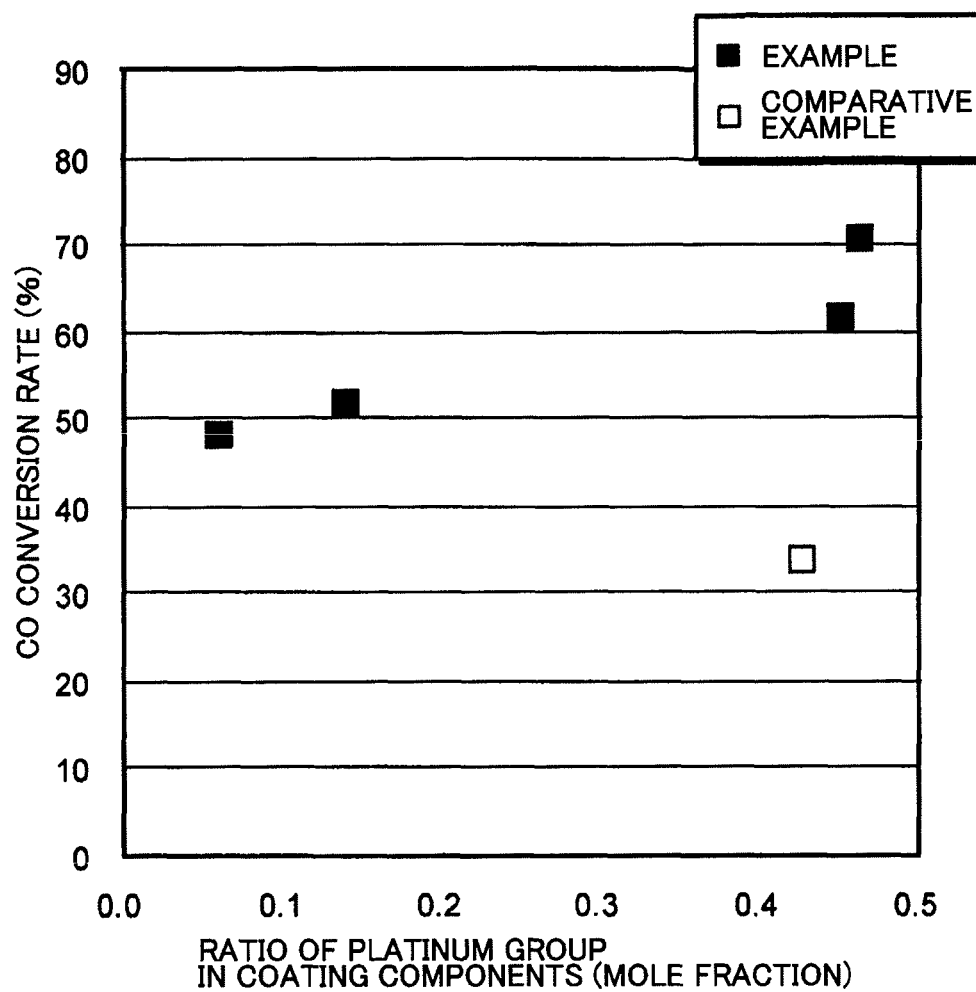
FIG. 4 is a graph showing CO conversion rate versus the ratio of a platinum group in coating components.

The above results are also shown in FIGS. 2 to 4. FIG. 2 shows the results for the chemical reduction rate indicating the ability to release oxygen. The vertical axis represents the mass (μg) after combustion, and the horizontal axis represents time (minutes). FIG. 2 shows the results for the present invention (Example 1), the results with no intervention of Al (Comparative Example 1), the results for the PM combustion catalyst only (Comparative Example 2), and the results when alumina and the platinum group elements were separately supported on the PM combustion catalyst (Comparative Example 4). In Comparative Example 1 in which no Al intervened and in Comparative Example 4 in which Al intervened but the platinum group elements were not dispersed in and supported by the Al, the reduction in mass increased significantly as time increased.

FIG. 3 shows the relation between the chemical reduction rate (the amount of oxygen released) and time elapsed. The vertical axis represents the chemical reduction rate (%/min), and the horizontal axis represents time elapsed (min). A comparison was made at an elapsed time shown as $V_{Rad:2}$ in FIG. 3. In Comparative Examples 1 and 4, it was found that the amount of oxygen released increased steeply as time increased. As can be seen from TABLE 1, the values of the PM combustion start temperature in these Comparative Examples were found to be low. However, it is inferred that, since only a given amount of oxygen has been stored, an excessive supply of oxygen may inactivate the ability to catalyze oxidation at an early stage. In addition, if the combustion of PM occurs at once, a DPF may be damaged by the combustion.

In this measurement, significantly unstable results were found at an early stage. This may be due to the influence of changing the atmosphere. Therefore, the results were compared not immediately after the change of the atmosphere but about 2 minutes after the change.

To maintain the catalytic activity for a long period of time, it is preferable that a sufficient amount of oxygen can be continuously supplied for PM combustion. From this point of view, the catalyst power obtained in Comparative Example 2 is sufficient, but its noxious gas purification activity (CO and HC conversion ratios) is insufficient. As can be seen from TABLE 1, in each of the catalyst compositions obtained in Examples 1 to 4, the chemical reduction rate (the amount of oxygen released) was similar to that in Comparative Example 2, the PM combustion activity was excellent, and also the high noxious gas purification activity in a low-temperature range was high.

FIG. 4 is a graph showing the correlation between the ratio of the supported platinum group elements and the CO conversion rate in the low-temperature range. The vertical axis represents the CO conversion rate (%), and the horizontal axis represents the ratio (mole fraction) of the platinum group elements in the platinum group-supporting carrier. In the catalyst compositions in Examples 1 to 4, although the amount used of the platinum group elements was small, or about 0.05 to about 0.5, conversion rates of about 50% or higher could be achieved even from the low-temperature range at 200° C. However, in the catalyst powder obtained in Comparative Example 4, although the amount of the platinum group elements used was equal to or larger than that in the present invention, the conversion rates were only slightly higher than 30%.

Therefore, the use of any of the catalyst compositions obtained in the Examples allows the amount of the platinum group elements used to be reduced and can therefore contribute to effective utilization of resources. In addition, since the catalyst compositions exhibit high noxious gas purification ability even in a relatively low temperature stage immediately after the start of an engine, an earth friendly diesel engine can be provided. In FIG. 4, solid squares represent the Examples, and an open square represents a Comparative Example.

Figure 5:
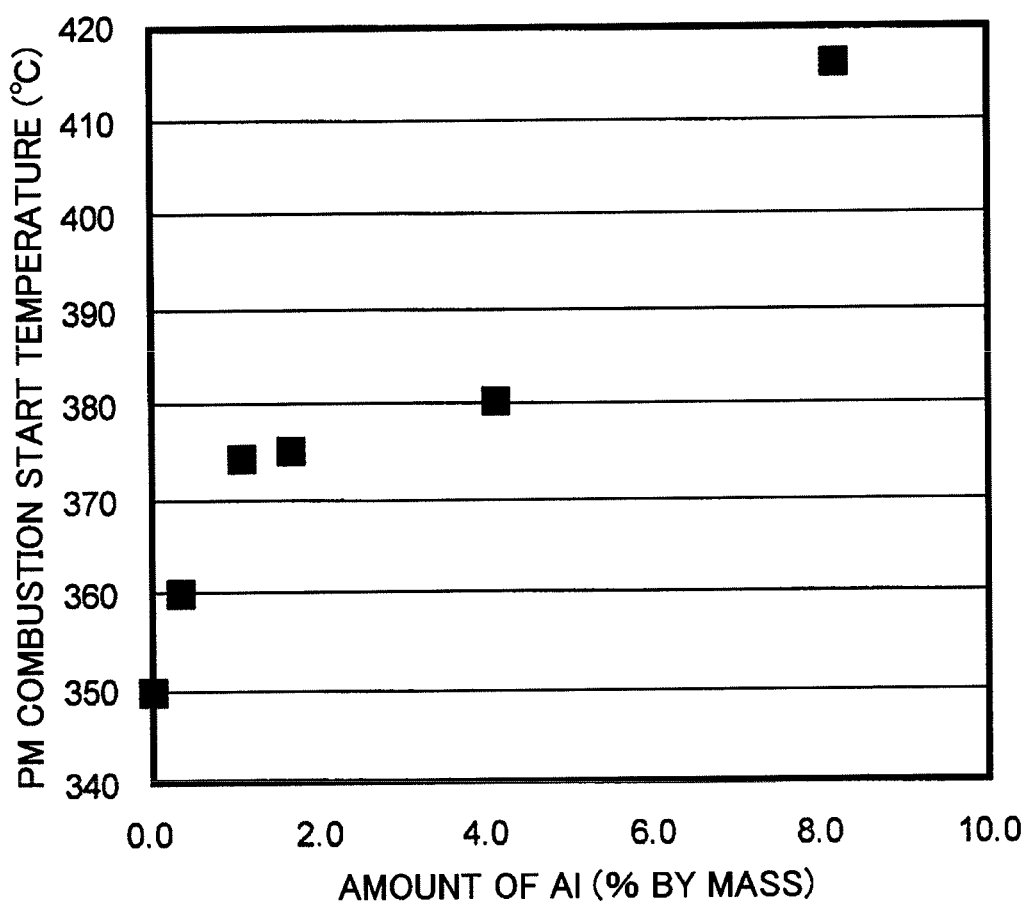
FIG. 5 is a graph showing PM combustion start temperature versus the amount of Al.

FIG. 5 is a graph showing the correlation between the PM combustion start temperature and the amount of Al. The vertical axis represents the PM combustion start temperature (° C.), and the horizontal axis represents the ratio (% by mass) of Al in the platinum group-supporting carrier. As can be seen from the graph, when the amount of Al is small, i.e., the absolute amount of the platinum group-supporting carrier supported on the surface of the Ce oxide is small, very high PM combustion activity can be achieved. The results of evaluation of the noxious gas purification activity of catalyst compositions having high PM combustion activity showed that the noxious gases purification performance was high particularly in the low-temperature range. Therefore, as can be seen from these results, to improve both the PM combustion activity and the noxious gas purification activity, it is preferable to reduce the amount of Al as much as possible.

Typically, when the mass ratio of the platinum group elements (Pt, Pd) to the components (Pt, Pd, Al) supported on the Ce oxide was about 0.1, there was a tendency that the combustion start temperature was high. However, when the ratio exceeded 0.2, there was a tendency that the combustion start temperature decreased. When the amount of Al exceeded 5.0% by mass, there was a tendency that the PM combustion start temperature increased slightly, as shown in FIG. 5. Therefore, the amount of Al supported on the Ce oxide is preferably 5.0% by mass or lower.

<Composition Analysis in Depth Direction>

For each of the catalyst composition in Example 1 and the catalyst powder in Comparative Example 4, the composition profile from the surface in a depth direction was examined using an XPS analyzer (XPS: X-ray Photoelectron Spectroscopy) (analysis area: 30 μmφ, photoelectron take-off angle: 15°, Ar sputtering rate: 1 nm/min (in terms of $SiO_2$)). In the catalyst composition in Example 1, the platinum group elements were dispersed in and supported by the platinum group-supporting carrier supported on the Ce oxide. In Comparative Example 4, the catalyst powder was produced such that alumina and the platinum group elements were successively supported on the Ce oxide.

Figure 6:
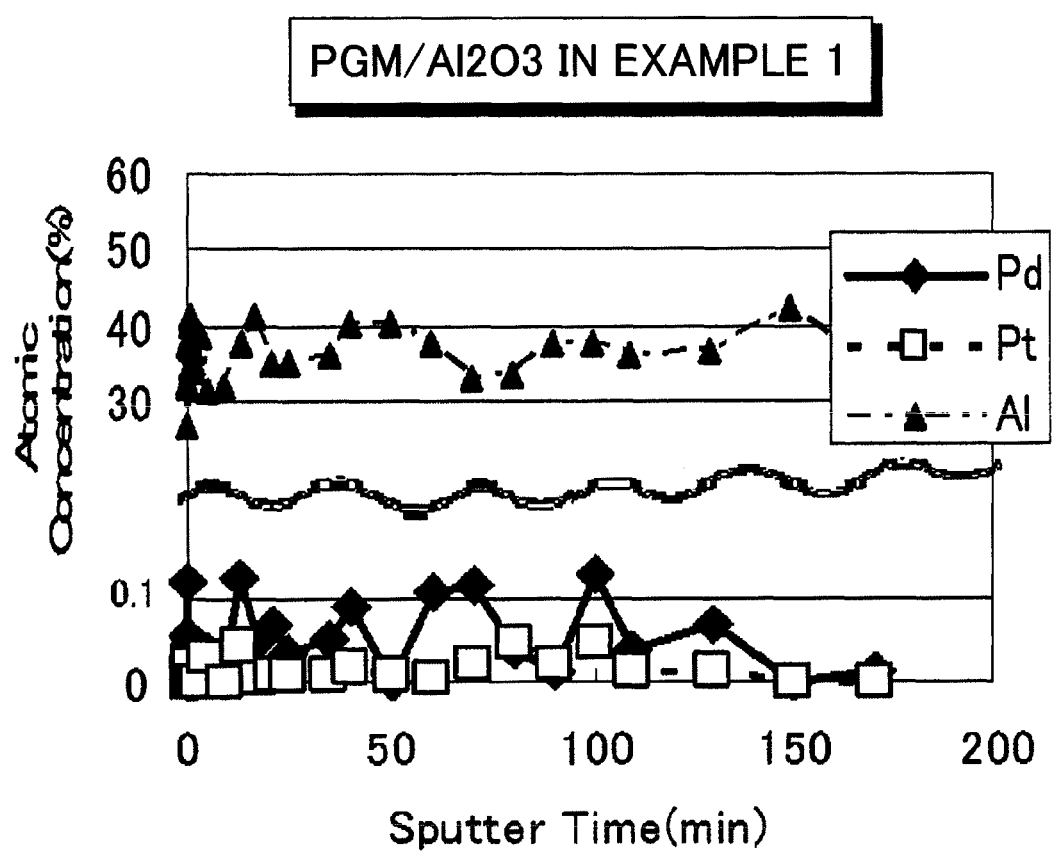
FIG. 6 is a graph showing the results of composition analysis performed on a platinum group-supporting carrier (alumina) prepared according to a synthesis method in Example 1, the composition analysis being performed from the surface of the carrier in a depth direction.
Figure 7:
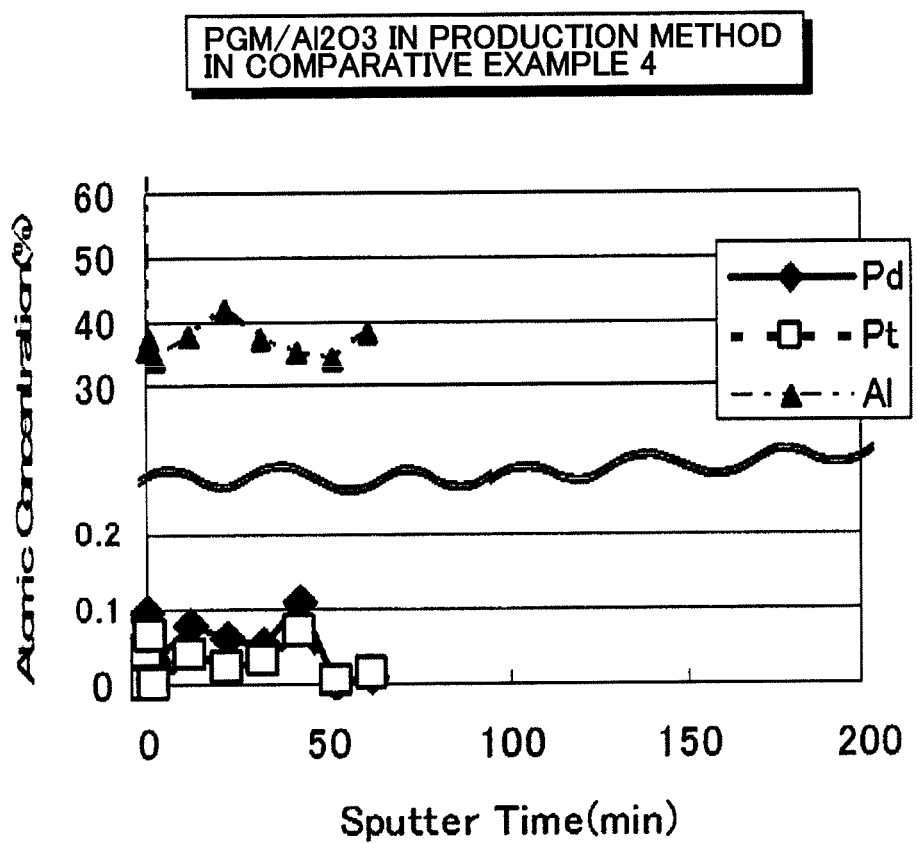
FIG. 7 is a graph showing the results of composition analysis performed on platinum group-supporting alumina prepared according to a synthesis method in Comparative Example 2, the composition analysis being performed from the surface of the alumina in the depth direction.

The results are shown in graphs in FIGS. 6 and 7. FIG. 6 shows the results for Example 1, and FIG. 7 shows the results for Comparative Example 4. In each of FIGS. 6 and 7, the vertical axis represents the element concentration (%), and the horizontal axis represents sputtering time. The sputtering rate is estimated to be 1 nm/min as described above, and therefore values on the horizontal axis can be converted to nm. The term "PGM" in the titles means the platinum group elements, and "$Al_2O_3$" means alumina.

As can be seen from FIGS. 6 and 7, in the catalyst composition in Example 1, Pt and Pd were present up to a depth of 150 nm from the surface. However, in the catalyst powder in Comparative Example 4, large amounts of Pt and Pd were found in a surface layer, but the presence of the platinum group elements was not found at depths larger than 50 nm.

Therefore, in the catalyst composition in Example 1 (the present invention), it is inferred that, since the platinum group elements are dispersed deep in pores in alumina, aggregation and growth by heat are suppressed and therefore high noxious gas purification activity is achieved even after withstanding high temperatures. However, with the supporting method in Comparative Example 4, the platinum group elements were supported on pores in a surface layer but did not reach deeper regions during the formation of the catalyst powder. It is inferred that this affects the noxious gas purification activity.

<Measurement of CO Adsorption>

To further examine the above inference, the amount of CO adsorbed on the surface was measured for each of the catalyst composition obtained in Example 1 and the catalyst powder obtained in Comparative Example 4. More specifically, each sample was treated using a CO adsorption measurement apparatus (CHEMBET, manufactured by Yuasa Ionics Co., Ltd.) as follows. Drying (He, 200° C., 60 minutes), removal of organic contaminants ($O_2$, 250° C., 15 minutes), chemical reduction of the platinum group elements ($H_2$, 250° C., 60 minutes), oxidation ($O_2$, R.T., 5 minutes), $CO_2$ treatment of the Ce oxide ($CO_2$, R.T., 5 minutes), and chemical reduction of the platinum group element surface ($H_2$, R.T., 5 minutes) were performed, and then CO pulse treatment was performed. During the above treatment, the apparatus was filled with an inert gas (He). The term "R.T." means room temperature.

As shown in the results in TABLE 2, the amount of CO adsorption was larger in the catalyst composition obtained in Example 1 than in the catalyst powder obtained in Comparative Example 4, and a reduction in the amount of CO adsorption after withstanding high temperatures (900° C., 10 hours) was smaller. Therefore, it was found that the aggregation and growth of the platinum group elements were easily suppressed in the catalyst composition obtained in Example 1. In the catalyst composition obtained in Example 1, when the diameter of the particles is computed under the assumption that all the platinum group elements are Pd, the average particle diameter is smaller than that in Comparative Example 4, and the growth ratio after withstanding high temperatures is much smaller.

TABLE 2

| SAMPLE | AMOUNT OF CO ADSORBED (µmol/g) | | AVERAGE PARTICLE DIAMETER WHEN PGM = Pd (nm) | |
|---|---|---|---|---|
| | INITIAL | AFTER WITHSTANDING HIGH TEMPERATURE | INITIAL | AFTER WITHSTANDING HIGH TEMPERATURE |
| EXAMPLE 1 | 45.5 | 26.0 | 4.83 | 8.45 |
| COMPARATIVE EXAMPLE 4 | 18.7 | 7.4 | 6.92 | 17.35 |

INDUSTRIAL APPLICABILITY

The catalyst composition of the invention can be used as a catalyst for exhaust gas purification that can treat different unnecessary components in an exhaust gas simultaneously, i.e., can perform PM combustion and purification of noxious gases simultaneously. Therefore, the use of a DPF using the catalyst composition allows noxious components in a diesel exhaust gas to be removed efficiently, and therefore environmentally friendly diesel engine systems can be provided. In addition, since only a small amount of platinum group elements are used, the catalyst composition contributes to effective utilization of resources. Since the catalyst composition exhibits high purification ability even in a relatively low temperature stage immediately after the start of an engine, the catalyst composition is expected to be used for earth friendly diesel engines.

The invention claimed is:
1. A method for producing a catalyst composition, comprising:
a step of mixing, in a liquid having pH of 11 to 12, at least one kind of platinum group element selected from Pt, Rh, and Pd and at least one kind of element selected from Zr, Al, Y, Si, Bi, Pr, and Tb to obtain a hydroxide gel;
an adhesion step of mixing the hydroxide gel with a Ce oxide containing Ce to cause the hydroxide gel to adhere to a surface of the Ce oxide; and
a step of subjecting the Ce oxide with the hydroxide gel adhering thereto to heat treatment.
2. The method for producing a catalyst composition according to claim 1, wherein the adhesion step is performed in an aqueous solution with a pH of 3 to 9.

* * * * *